United States Patent [19]
Merrell et al.

[11] 3,831,069
[45] Aug. 20, 1974

[54] MINIATURE CAPACITANCE LEVEL DETECTOR

[75] Inventors: Kenneth C. Merrell, Brea; Oscar J. Petersen, Orange, both of Calif.

[73] Assignee: Robertshaw Controls Company, Richmond, Va.

[22] Filed: Nov. 3, 1972

[21] Appl. No.: 303,586

[52] U.S. Cl.............. 317/246, 73/304 C, 317/256
[51] Int. Cl............................................. H01g 7/00
[58] Field of Search.......... 317/246, 256; 73/304 C; 174/52 S, 59

[56] References Cited
UNITED STATES PATENTS

| | | | |
|---|---|---|---|
| 2,434,102 | 1/1948 | Channell............................ | 174/59 |
| 2,601,918 | 7/1952 | Huetten......................... | 174/52 S X |
| 2,720,624 | 10/1955 | Gunst............................. | 317/246 X |
| 3,262,032 | 7/1966 | Levine............................. | 317/246 |
| 3,523,245 | 8/1970 | Love................................... | 324/61 |

Primary Examiner—E. A. Goldberg
Attorney, Agent, or Firm—Anthony A. O'Brien

[57] ABSTRACT

A level detecting probe is constructed with a capacitor having a capacitance which varies in accordance with the level of the material under observation. The probe is self-contained in that its electrical circuitry is enclosed within a housing forming a part of the probe. In one probe embodiment for detecting the level of conductive materials the capacitor includes a conductive rod as one plate that is insulated from the conductive material which acts as the other plate. Another probe embodiment for non-conductive materials includes a conductive rod and conductive sleeve surrounding the rod and insulated therefrom as the plates of the capacitor with the non-conductive material acting as the dielectric therebetween.

12 Claims, 4 Drawing Figures

3,831,069

MINIATURE CAPACITANCE LEVEL DETECTOR

BACKGROUND OF THE INVENTION

1. Field of the Invention

The present invention pertains to level detecting probes and more particularly to capacitance responsive level detecting probes.

2. Description of the Prior Art

Capacitance responsive level detecting probes wherein a capacitor sensor develops a capacitance which is commensurate with the level of material under observation have been in general use for many years. A typical level detecting probe of this type is disclosed in U.S. Pat. No. 4,277,511 wherein the probe includes a pair of concentrically disposed conductive members as the capacitor sensor which are supported by a housing in a mutually insulated manner. The circuitry associated with the probe is externally disposed and consequently requires cables connecting it to the conductive members of the probe. Such an arrangement diminishes the accuracy and sensitivity of the probe to capacitance variations in the material under observation due to the presence of the added capacitance of the cables and since the cable length and capacitance may vary depending on the particular application, the accuracy and sensitivity for each given application will likewise vary. Further, the probe is unduly large and the probe structure lacks rigidity required in many applications resulting in errors in the level detecting caused by slight relative displacements of the conductive members of the capacitor sensor during use.

Another capacitive responsive level detecting probe which is disclosed in U.S. Pat. No. 3,199,350 3,199,350 includes a pair of concentrically disposed conductive members as the capacitor sensor and the circuitry associated therewith affixed to the probe at an upper portion thereof. This level detecting probe overcomes cable capacitance problems by locating the circuitry proximate the probe but it is also unduly large as well as being vulnerable to errors due to lack of rigidity in the probe structure which enables relative displacement of the conductive members during use.

SUMMARY OF THE INVENTION

Accordingly, it is an object of the present invention to construct a level detecting probe having high accuracy and sensitivity.

The present invention is summarized in a capacitance probe including housing means having cavity means therein, aperture means in the housing means extending from an outer surface of the housing means and communicating with the cavity means, capacitor means including a cylindrical conductor extending away from the housing means and having a smaller diameter shaft portion extending into the cavity means through the aperture means, spacer means in the aperture means and the cavity means for fixedly retaining the shaft portion of the cylindrical conductor in the aperture means, and means in the cavity means supported by the spacer means for supporting electrical components associated with the capacitor means.

Another object of this invention is to produce a self-contained level sensing probe.

Still another object of this invention is to provide a level sensing probe having a rigidly supported probe capacitor as a part thereof.

Yet another object of this invention is to construct a miniaturized level detecting capacitance probe.

Further objects and advantages of the present invention will become apparent from the following description of the preferred embodiments when taken in conjunction with the accompanying drawings.

DESCRIPTION OF THE PREFERRED EMBODIMENTS

Figure 1:
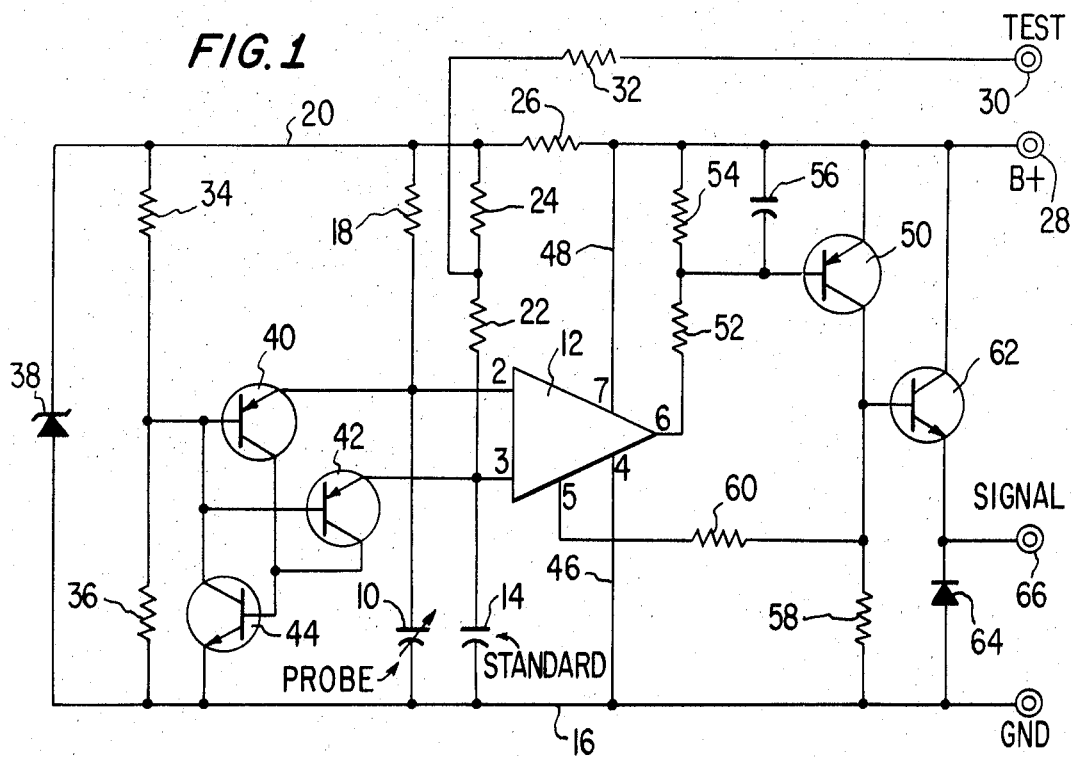
FIG. 1 is a schematic diagram of an embodiment of circuitry employed in the present invention.

With reference to the circuit embodiment of FIG. 1, the capacitor of the level detecting probe having a capacitance which varies in accordance with the material is indicated at 10, and will hereafter be referred to as probe capacitor 10. A general purpose integrated circuit differential amplifier 12 has an inverting input 2 connected to probe capacitor 10 and a non-inverting input 3 connected through a standard capacitor 14 to ground 16.

The probe capacitor 10 and the standard capacitor 14 each have a charging circuit in series therewith, the charging circuit for probe capacitor 10 including a resistor 18 connected to bias line 20, and the charging circuit for the standard capacitor 14 including a pair of series resistors 22 and 24 likewise connected to bias line 20. Bias line 20 is connected through a current limiting resistor 26 to a voltage supply terminal 28 which along with ground 16 is adapted to receive the positive and negative terminals, respectively, of a direct current voltage source (not shown). A test terminal 30 is connected to the junction between charging resistors 22 and 24 via resistor 32.

A discharge network for the probe capacitor 10 and the standard capacitor 14 includes a voltage divider network formed from a pair of resistors 34 and 36 which are energized from bias line 20 and which have a voltage regulating zener diode 38 in shunt thereacross. A pair of transistors 40 and 42 having commonly connected bases and collectors have their emitters connected to the probe capacitor 10 and the standard capacitor 14, respectively, and their bases connected to a junction between voltage dividing resistors 34 and 36. The commonly connected collectors of transistors 40 and 42 are joined to the base of a transistor 44 whose collector-emitter circuit is in shunt across resistor 36.

The general purpose integrated circuit differential amplifier 12 has a pair of biasing terminals indicated as 4 and 7 which are connected to ground 16 and voltage supply terminal 28 via lines 46 and 48, respectively, and an output terminal 6 joined to the base of a transistor 50 through a resistor 52. The base-emitter circuit of transistor 50 has a parallel resistor 54 and capacitor 56 network in shunt thereacross while the emitter-collector circuit of transistor 50 is disposed between voltage supply terminal 28 and ground 16 through a resistor 58. A positive feedback line which includes resistor 60 extends from the junction of the collector of transistor 50 and resistor 58 to terminal 5 of the differential amplifier 12.

An output driver transistor 62 has its collector-emitter circuit connected across the voltage supply terminal 28 and ground 16 through the intermediary of a protective diode 64 while the base is connected to the collector of transistor 50. An output signal terminal 66 is joined to the junction of the emitter of transistor 62 and protective diode 64.

Figure 2:
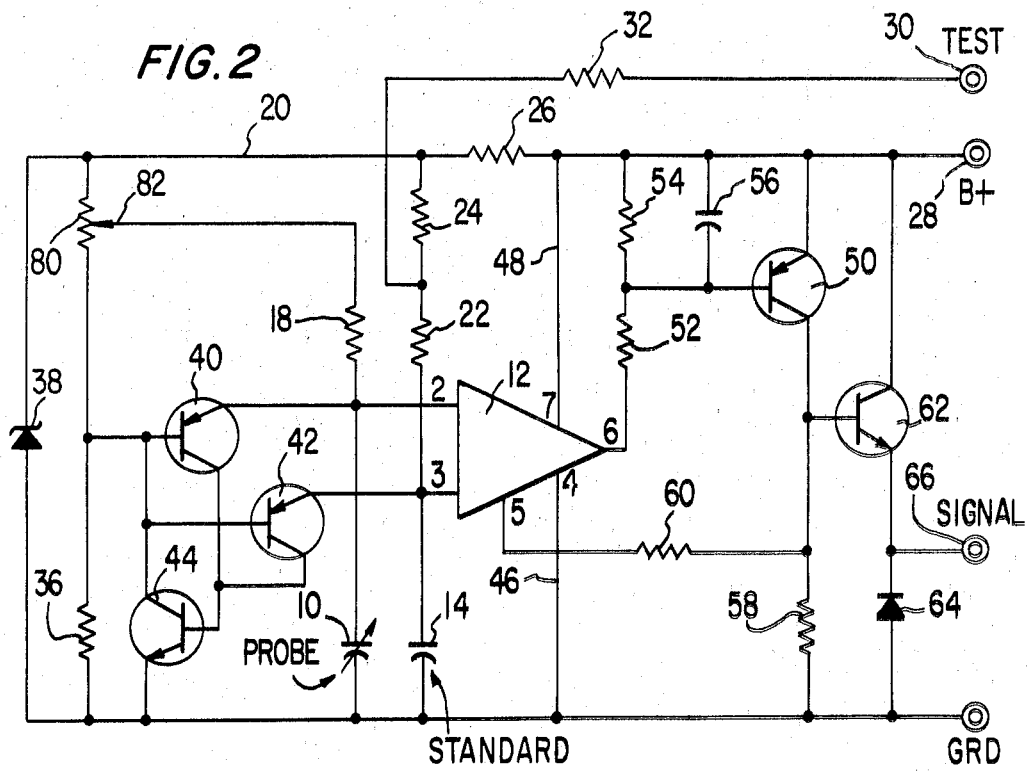
FIG. 2 is a schematic diagram of another embodiment of circuitry employed in the present invention.

The embodiment of FIG. 2 is an improvement over the embodiment of FIG. 1 in the inclusion of an adjustability feature. As shown, the voltage divider resistor 34 in FIG. 1 associated with the capacitor discharging network has been replaced in FIG. 2 with a potentiometer 80 having a wiper 82. The charging resistor 18 for probe capacitor 10 is now connected to bias line 20 through the wiper 82 of potentiometer 80 rather than being directly connected thereto as in FIG. 1. The remainder of the circuitry of FIG. 2 is otherwise identical to that of FIG. 1.

Figure 3:
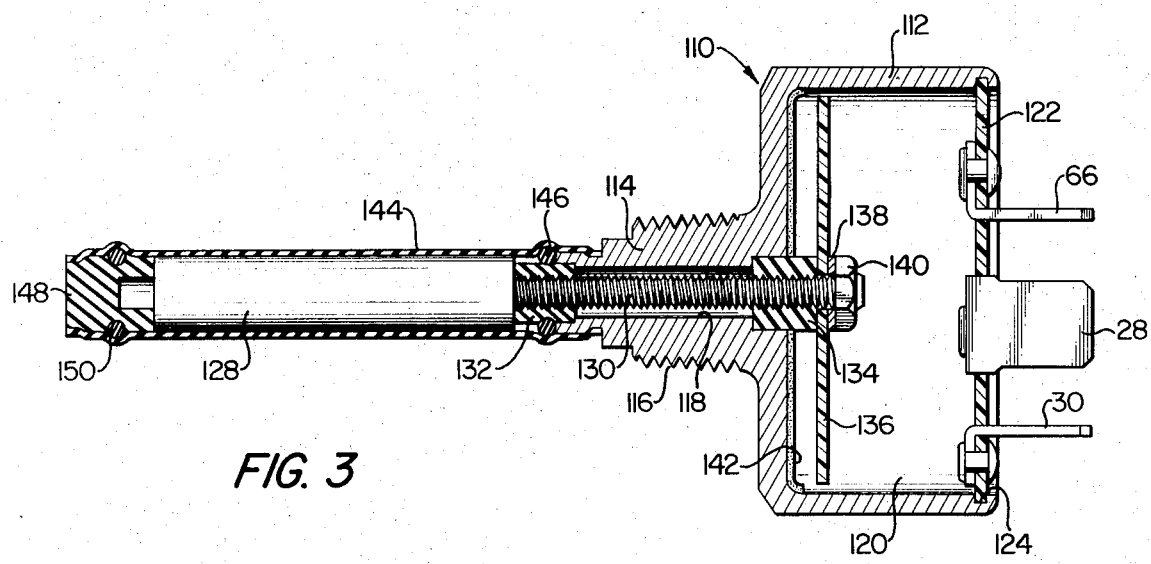
FIG. 3 is a cross-sectional view of a level detecting probe of the present invention for use with the circuitry of FIGS. 1 and 2.

The level detecting probe in FIG. 3, which is intended for use in detecting levels of conductive materials in general, is shown exclusive of circuitry in the interest of clarity with the understanding that the circuitry of FIGS. 1 or 2 is to be utilized as an integral part thereof.

The level detecting probe includes a housing, indicated at 110, having a hexagonally shaped body portion 112 and a smaller cylindrical portion 114 extending therefrom in coaxial alignment with body portion 112. Housing 110 may be formed from conductive materials such as brass or non-conductive materials such as plastic. The cylindrical portion 114 has screw threads 116 on its outer surface and contains a centrally disposed bore 118 extending completely therethrough and communicating with a cavity 120 within the body portion 112 of housing 110. Cavity 120 is enclosed by a non-conductive partition 122 which is retained by a continuous slot 124 disposed in the inner walls of cavity 120. The partition 122 has voltage supply terminal 28, test terminal 30 and output signal terminal 66 affixed thereto such as by rivets or the like.

A conductive rod 128 having a cylindrical configuration has a smaller diameter screw threaded shaft portion 130 which extends through bore 118 into cavity 120. A pair of insulating spacer supports 132 and 134 are disposed between bore 118 and shaft portion 130. A circuit board 136, which normally would support the electrical components and circuitry of either of FIGS. 1 or 2 except for terminals 28, 30 and 66 supported by partition 122, is supported by insulating spacer support 132 and is retained in place by a washer 138 and nut 140 threaded onto shaft portion 130 which extends through an aperture therein. Sealing material 142 is disposed within the cavity proximate the bore 118 and insulating spacer support 134.

An insulating sleeve 144 is affixed to the smaller cylindrical portion 114 of housing 110 and encompasses the conductive rod 128. Sleeve 144 is preferably shrink fitted in place and has an O-shaped sealing ring 146 disposed thereunder abutting cylindrical portion 114 and insulating support 132. The opposite end of sleeve 144 has a non-conductive plug 148 therein and another O-shaped sealing ring 150 disposed between an inner wall of sleeve 144 and plug 148.

Figure 4:
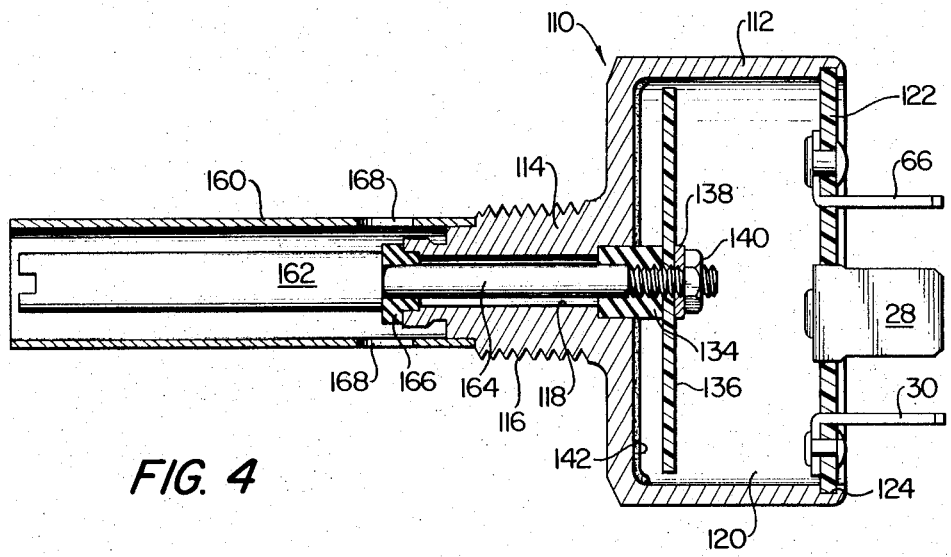
FIG. 4 is a cross-sectional view of another embodiment of a level detecting probe for use with the circuitry of FIGS. 1 and 2.

The level detecting probe of FIG. 4 is intended for use in detecting levels of non-conductive materials in general. As in FIG. 3, this probe is also shown exclusive of circuitry with the understanding that the circuitry of FIGS. 1 or 2 is to be utilized as an integral part thereof.

The probe of FIG. 4 differs from that of FIG. 3 in including a conductive sleeve 160 extending from the housing (in place of the insulating sleeve 144, plug 148 and sealing ring 150 of FIG. 3) which encompasses a conductive rod 162 of lesser diameter than conductive rod 128 of FIG. 3 while being spaced and electrically insulated therefrom. The conductive rod 162 has a smaller diameter shaft portion 164 which extends through bore 118 into cavity 120. A smaller insulating spacer support 166 replaces the spacer support 132 and sealing ring 146 of FIG. 3. The conductive sleeve 160 is open at its end away from the housing 110 to allow entry of the material under observation therein and includes one or more drainage apertures 168 in its end adjacent the housing 110.

The circuitry of FIGS. 1 or 2, when contained within cavity 120 of the level detecting probes of FIGS. 3 or 4 would have the shaft portion of conductive rods 128 or 162 electrically connected to the inverting input terminal 2 of the differential amplifier 12. Accordingly, the probe capacitor 10 as referred to in the description of FIGS. 1 and 2 would consist of conductive rod 128 and the conductive liquid being monitored as the respective capacitor plates in the level detecting probe of FIG. 3, and conductive rod 162 and conductive sleeve 160 as the respective capacitor plates in the level detecting probe of FIG. 4. The housing 110 may act as the ground 16 for the circuit or an additional terminal (not shown) may be disposed in partition 122 in cases where the housing 110 is formed of an insulating material such as plastic, and provision would be made to ground the conductive sleeve 160.

The level detecting operation will now be described with respect to the circuit embodiment of FIG. 1 in conjunction with the probe assembly of FIG. 3 for exemplary purposes. The probe assembly of FIG. 3 will be disposed in the conductive material to be monitored such as the liquid coolant in the radiator of a vehicle. The radiator will be drilled and threaded to receive the screw threads 116 of the level detecting probe which may be screwed into place by hand or by use of a wrench applied to the hexagonally shaped body portion 112. The liquid coolant will be grounded, such as by grounding the radiator to thereby function as the grounded plate of probe capacitor 10 which includes conductive rod 128 as the other plate as discussed above, with the insulating sleeve 144 as the dielectric separating the respective plates. Accordingly, as the liquid coolant level varies to cover more or less of the insulating sleeve 144, the capacitance of the probe will likewise vary. A switch (not shown), such as the ignition switch of the vehicle, may be utilized to selectively energize the system from a suitable voltage source such as the vehicle battery.

When the system is initially energized, all of the transistors are non-conducting and the probe capacitor 10 and standard capacitor 14 are in an uncharged state. Probe capacitor 10 immediately begins to receive charging current from the voltage source connected to voltage supply terminal 28 through charging resistor 18 and simultaneously, the standard capacitor 14 begins to be charged through charging resistors 22 and 24. Both probe capacitor 10 and standard capacitor 14 charge exponentially until either or both charges to a voltage level which exceeds the voltage applied to the base of transistors 40 and 42 by the voltage divider network including resistors 34 and 36 regulated by zener diode 38 to thereby forward bias either or both transistors 40 and 42 into conduction. Conduction of either of transistors 40 and 42 causes transistor 44 to also become forward biased into conduction which instantaneously causes whatever one of transistors 40 and 42 which previously may have been non-conductive to assume a forward bias condition thereby becoming conductive. The above-described initiation of conduction in transistors 40, 42 and 44 occurs in a substantially simultaneous fashion to thereby enable the simultaneous discharge of both the probe capacitor 10 and the standard capacitor 14, with the discharge circuit for probe capacitor 10 including the emitter-base circuit of transistor 40 in series with the collector-emitter circuit of transistor 44 as parallelled by the emitter-collector circuit of transistor 40 in series with the base-emitter circuit of transistor 44 and the discharge circuit for the standard capacitor 14 including the emitter-base circuit of transistor 42 in series with the collector-emitter circuit of transistor 44 being parallelled by the emitter-collector circuit of transistor 42 in series with the base-emitter circuit of transistor 44. During the discharge, transistor 44 is operating at saturation thereby reducing the voltage across resistor 36 to the collector-emitter saturation voltage of transistor 44 and assuring nearly complete discharge of probe capacitor 10 and standard capacitor 14. Once discharged, transistors 40, 42 and 44 cease to conduct and probe capacitor 10 and standard capacitor 14 restart their charging cycle.

The time or period between discharge cycles is determined by the smaller of either the probe capacitor 10 or the standard capacitor 14 for the case where the resistances of each charging circuit are of equal value, and may be expressed:

$$\text{Period} = RC\left(\text{natural logarithm} \frac{\text{regulated voltage}}{\text{reg. voltage} - \text{ref. voltage}}\right)$$

Where R is equal to the resistance of the charging resistor; C is equal to the smaller of either the probe capacitance or the standard capacitance; the regulated voltage is established by zener diode 38; and the reference voltage is established at the junction of resistors 34 and 36.

The charging rates of the probe capacitor 10 and the standard capacitor 14 are sensed and compared by the general purpose integrated circuit differential amplifier 12. If the level of the liquid coolant in the radiator is higher than the level at which an indication is desired, the capacitance value of probe capacitor 10 will be greater than the capacitance value of standard capacitor 14. This results in a charging rate for the probe capacitor 10 which is less than the charging rate of the standard capacitor 14, and the differential amplifier 12 will produce a positive output signal in response thereto. Transistors 50 and 62 are not responsive to this positive output signal and remain non-conductive and accordingly, output signal terminal 66 will remain in an unenergized state as an indication of adequate liquid level in the radiator.

If the level of the liquid in the radiator has receded to a level less than or equal to the level at which an indication is desired, the capacitance value of probe capacitor 10 will then be smaller than the capacitance value of the standard capacitor 14 and the charging rate of probe capacitor 10 will exceed that of standard capacitor 14. The differential amplifier 12 will produce a negative output signal at terminal 6 in response thereto which is transferred through resistor 52 to the base of transistor 50 to establish current flow through resistor 54 and thereby forward bias the emitter-base junction of transistor 50 causing it to assume a conductive state. The resultant current flow through its emitter-collector circuit and resistor 58 in series therewith forward biases transistor 62 into conduction in its saturation region. The conduction of transistor 62 provides a low liquid level indicating voltage output signal across diode 64 at signal output terminal 66 having a magnitude equal to the supply voltage applied at terminal 28 minus the collector-emitter saturation voltage of transistor 62. This voltage output signal may power an indicator (not shown) or may be utilized for control purposes.

The response of differential amplifier 12 is reasonably slow, and as a result, some integration of the negative output signal therefrom is effected which is further aided by capacitor 56 such that when transistor 50 becomes conductive in response to the negative output signal it remains on through the discharge cycle so as not to cause pulses to appear in the output voltage of transistor 62.

To assure bistable switching action of the output voltage signal at terminal 6 of differential amplifier 12, positive feedback of the voltage across resistor 58 is provided by resistor 60. As the negative output voltage signal from the differential amplifier 12 starts to increase, resistor 60 effectively unbalances the input of the differential amplifier 12 to cause bistable action. Resistor 58 provides a low impedance path for the base of transistor 62 to assure good cut-off.

The level detecting probe may be checked at any time for proper circuit operation by selectively shorting test terminal 30 to ground 16 such as through an external switch (not shown). Shorting terminal 30 to ground reduces the charging potential available to standard capacitor 14 thereby effecting a reduction in its charging rate such that the charging rate of the probe capacitor 10 is now the greater charging rate as between the two. The differential amplifier 12 will accordingly produce a negative output signal at terminal 6 which causes transistors 50 and 62 to conduct as described above and thereby produce an output signal at terminal 66 simulating a low liquid level condition as an indication of proper circuit operation.

If the level detecting probe of FIG. 3 contained the circuitry of FIG. 2, it would have the added capability of an adjustable operating point, that is, the point at which the level of the material must reach to enable the differential amplifier 12 to produce a negative output signal at terminal 6 would be adjustable. Due to the wide range of capacitance variation that the probe capacitor of the level detecting probe of FIG. 3 undergoes, this adjustability feature is less critical in the level detecting probe of FIG. 3 since the operating point of the system will not vary appreciably and will remain at or near the center of the probe capacitor 10. However, in detecting the levels of non-conductive liquids with the level detecting probe of FIG. 4, the capacitance variation of the probe capacitor is greatly reduced as compared to that of the level detecting probe of FIG. 3 which can easily result in an operating point off the probe, making it unresponsive to variations in the level of the material being monitored and therefore inoperative. Under such a circumstance, the adjustability feature is especially significant for maintaining the operating point on the probe at all times during use. This makes the circuit of FIG. 2 especially desirable in conjunction with the level detecting probe of FIG. 4.

In operation, wiper 82 of potentiometer 80 will be set in position to select a total resistance value for the charging circuit of the probe capacitor 10 which establishes an operating point at or near the center of the probe capacitor. The remaining operation of the circuitry of FIG. 2 is otherwise identical to that of FIG. 1.

The level detecting probe of FIG. 4 having the circuitry of FIGS. 1 or 2 therein would be utilized in the same way as described with respect to the level detecting probe of FIG. 3 except that the liquid under observation would be non-conductive and would not be grounded since it functions as the dielectric of the probe capacitor 10 rather than as a capacitor plate as in FIG. 3.

A plurality of systems have been disclosed which are advantageous in that they are highly sensitive and capable of great accuracy over a wide range of capacitance variation, and are versatile in that they can be utilized to monitor any number of diverse type materials. Further, although the level detecting probes have been described as low level detectors, that is, responsive to a decrease in level to below a predetermined point, they may be modified to be responsive to a level buildup when desired by merely reversing probe capacitor 10 and standard capacitor 14 relative to the inputs of the differential amplifier 12.

Inasmuch as the present invention is subject to many variations, modification and changes in detail, it is intended that all matter contained in the foregoing description or shown in the accompanying drawings shall be interpreted as illustrative and not in a limiting sense.

What is claimed is:

1. A capacitance probe comprising:
   housing means having cavity means therein; means defining an aperture in said housing means extending from an outer surface of said housing means and communicating with said cavity means;
   capacitor means including a conductor extending away from said housing means and having a portion extending into said cavity means through said aperture;
   insulating spacer means in said aperture for fixedly retaining said portion of said conductor in said aperture;
   said insulating spacer means extending into said cavity means and surrounding said portion of said conductor; and
   circuit board means in said cavity means supported on said insulating spacer means for supporting electrical components associated with said capacitor means;
   said circuit board means having an aperture therein receiving said portion of said conductor therethrough for retention on said insulating spacer.

2. The invention of claim 1 wherein said capacitor means includes an outer sleeve extending away from said housing means and surrounding said conductor.

3. The invention of claim 2 wherein said outer sleeve is a conductive sleeve which is insulatingly spaced from said conductor.

4. The invention of claim 3 wherein said conductive sleeve contains at least one aperture disposed therein at a position adjacent said housing means.

5. The invention of claim 2 wherein said outer sleeve is an insulating sleeve, and further including means sealing the extended portion of the sleeve to enclose the conductor member therein.

6. A capacitance probe comprising:
   housing means having cavity means therein;
   aperture means in said housing means extending from an outer surface of said housing means and communicating with said cavity means;
   capacitor means including a cylindrical conductor extending away from said housing means and having a smaller diameter shaft portion extending into said cavity means through said aperture means;
   said capacitor means also including an outer insulating sleeve having a portion extending away from said housing means and surrounding said cylindrical conductor;
   insulating spacer means in said aperture means and extending into said cavity means for fixedly retaining the shaft portion of said cylindrical conductor in said aperture means;
   circuit board means in said cavity means supported on said insulating spacer means for supporting electrical components associated with said capacitor means;
   said circuit board means having an aperture therein receiving said shaft portion therethrough for retention on said insulating spacer means; and
   means sealing the extended portion of the sleeve to enclose the cylindrical conductor therein including an insulating plug disposed in the sleeve and a sealing ring disposed between said plug and said sleeve.

7. The invention of claim 1 wherein the means defining an aperture in said housing means comprises a housing having a cylindrical inner bore and a cylindrical outer surface coaxial with said bore, and screw threads on said cylindrical outer surface for mounting the capacitance probe.

8. The invention of claim 7 wherein the housing means has a hexagonal outer surface portion to facilitate mounting.

9. A capacitance probe comprising:
   housing means having cavity means therein;
   aperture means in said housing means extending from an outer surface of said housing means and communicating with said cavity means;
   capacitor means including a cylindrical conductor extending away from said housing means and having a smaller diameter shaft portion extending into said cavity means through said aperature means;
   insulating spacer means in said aperture means and extending into said cavity means for fixedly retaining the shaft portion of said cylindrical conductor in said aperture means; and
   a circuit board in said cavity means having a aperture therein receiving said shaft portion therethrough and supported on said spacer means for supporting electrical components associated with said capacitor means.

10. The invention of claim 9 wherein the shaft portion extending into said cavity means is screw threaded and further including nut means on said screw threaded shaft portion retaining said circuit board in place.

11. The invention of claim 9 wherein the housing means has an insulating partition therein adjacent said cavity means and terminal means affixed to said partition and extending from outside said housing means into said cavity means.

12. The invention of claim 11 wherein said terminal means includes a voltage supply terminal, a test terminal and a signal terminal.

* * * * *